Figure 1:
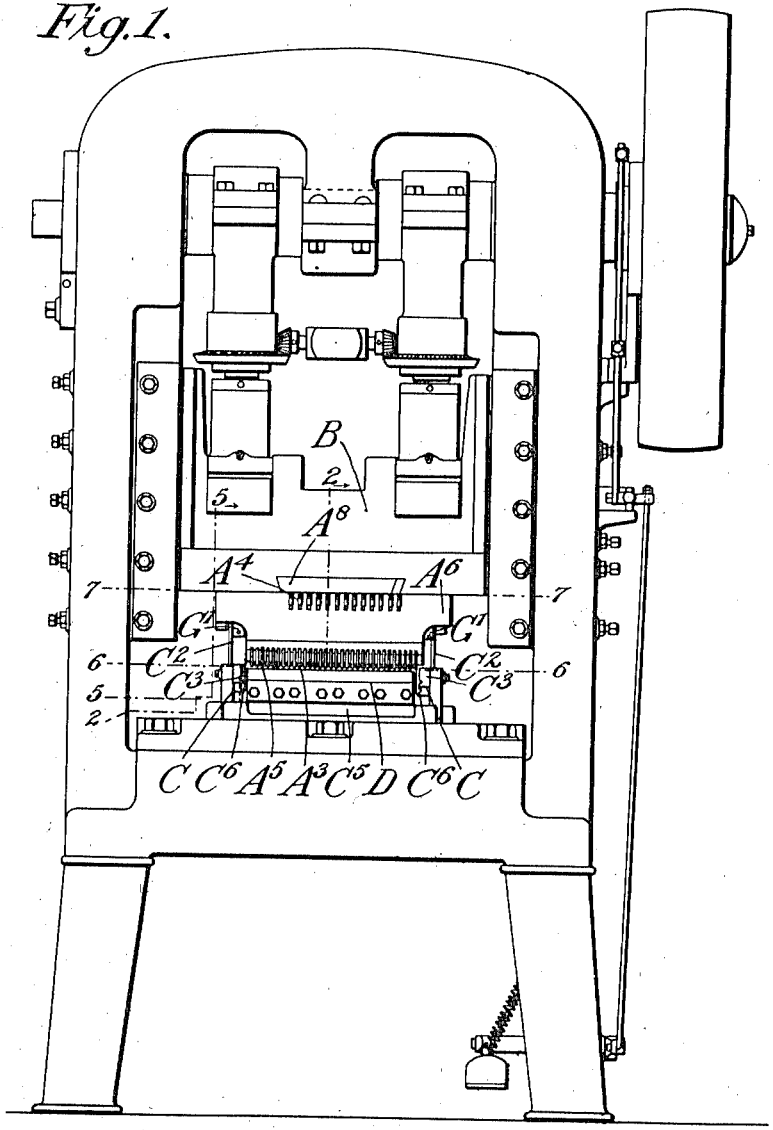

F. H. PIERPONT.
STAMPING, PUNCHING, SHEARING, OR SIMILAR MACHINE.
APPLICATION FILED MAR. 4, 1912.

1,061,563.

Patented May 13, 1913.
10 SHEETS—SHEET 1.

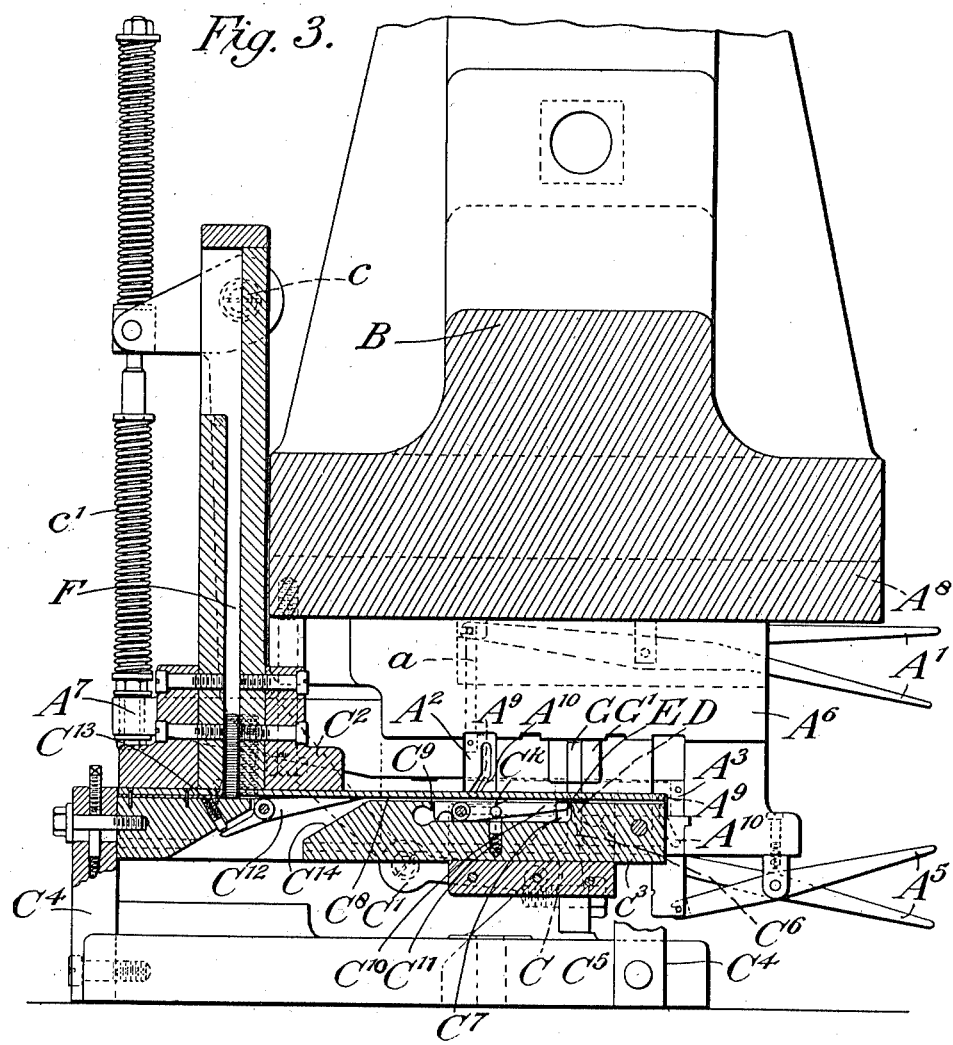

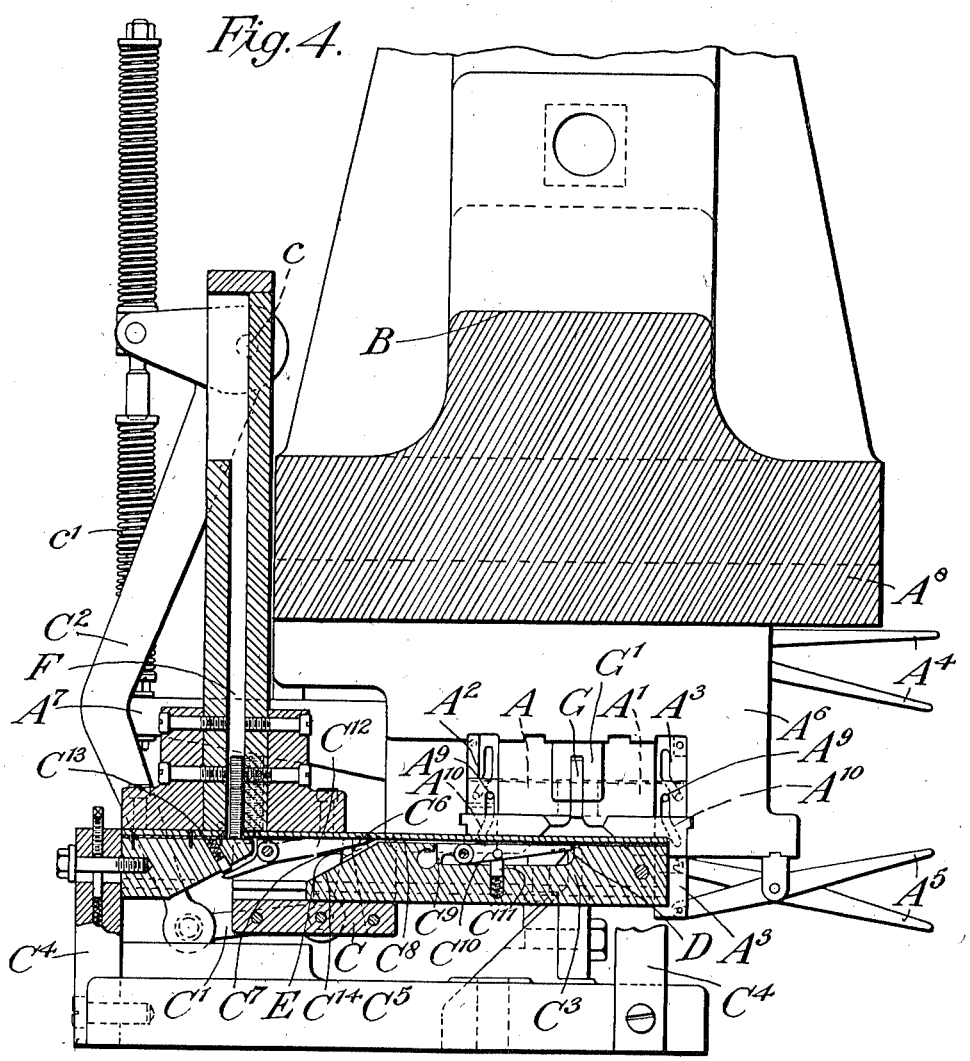

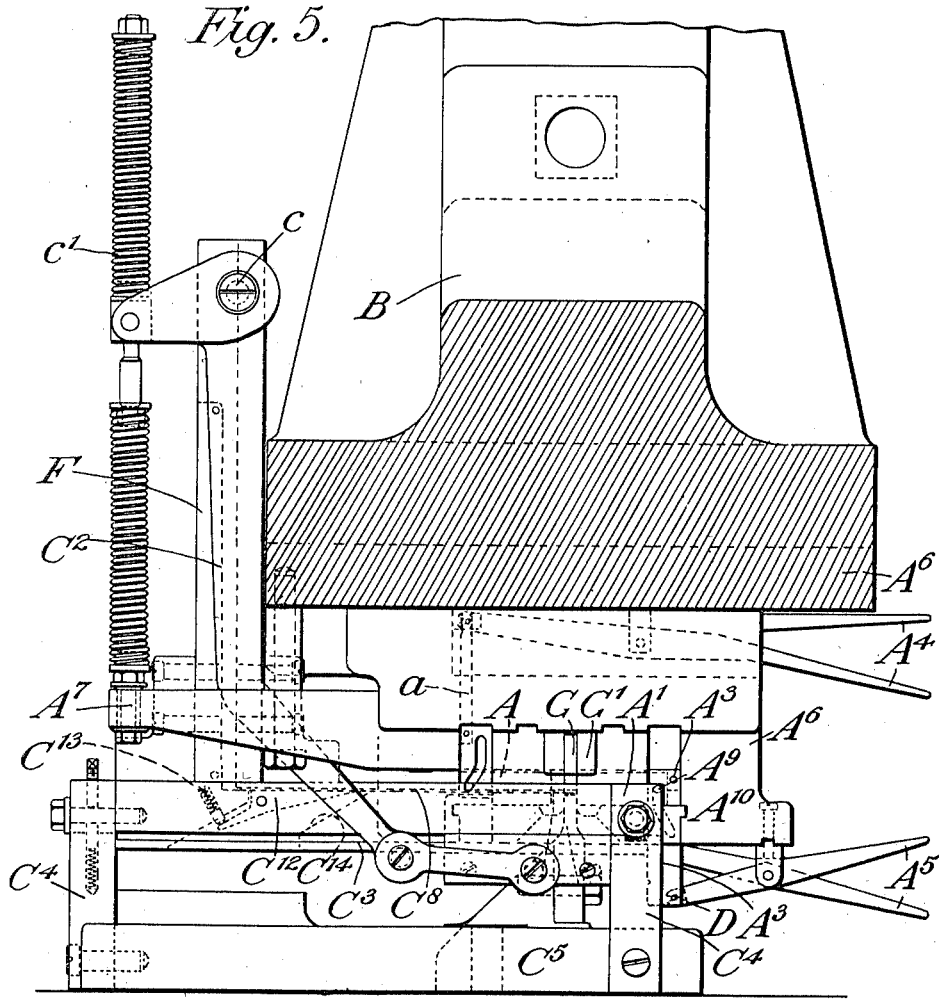

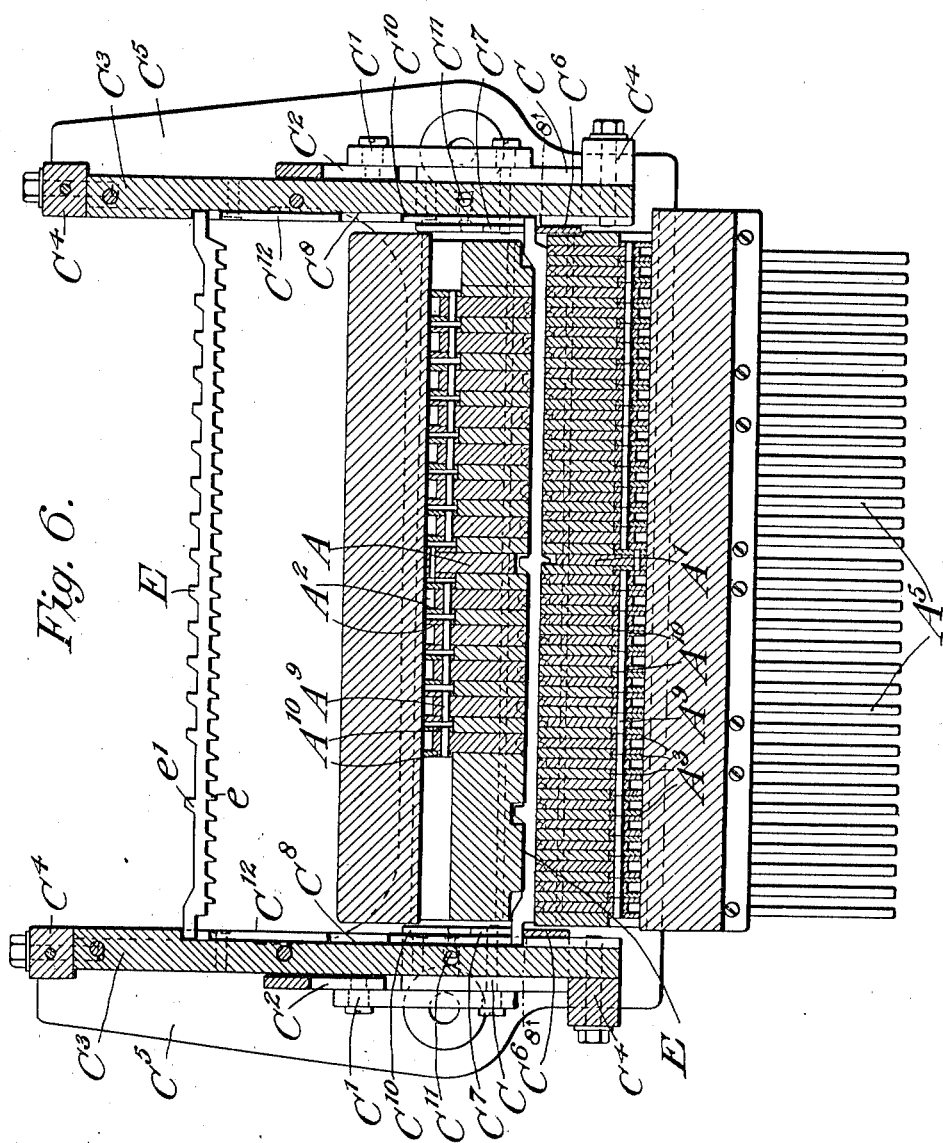

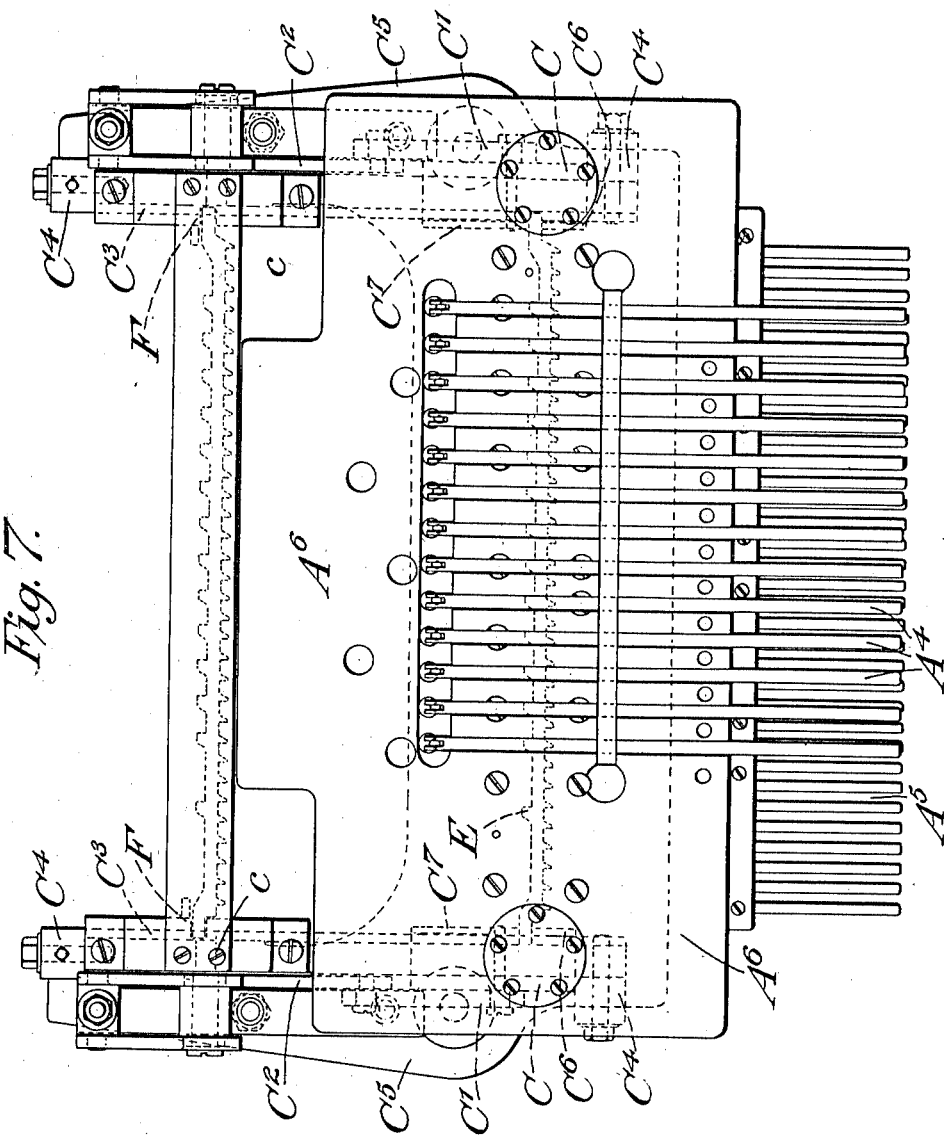

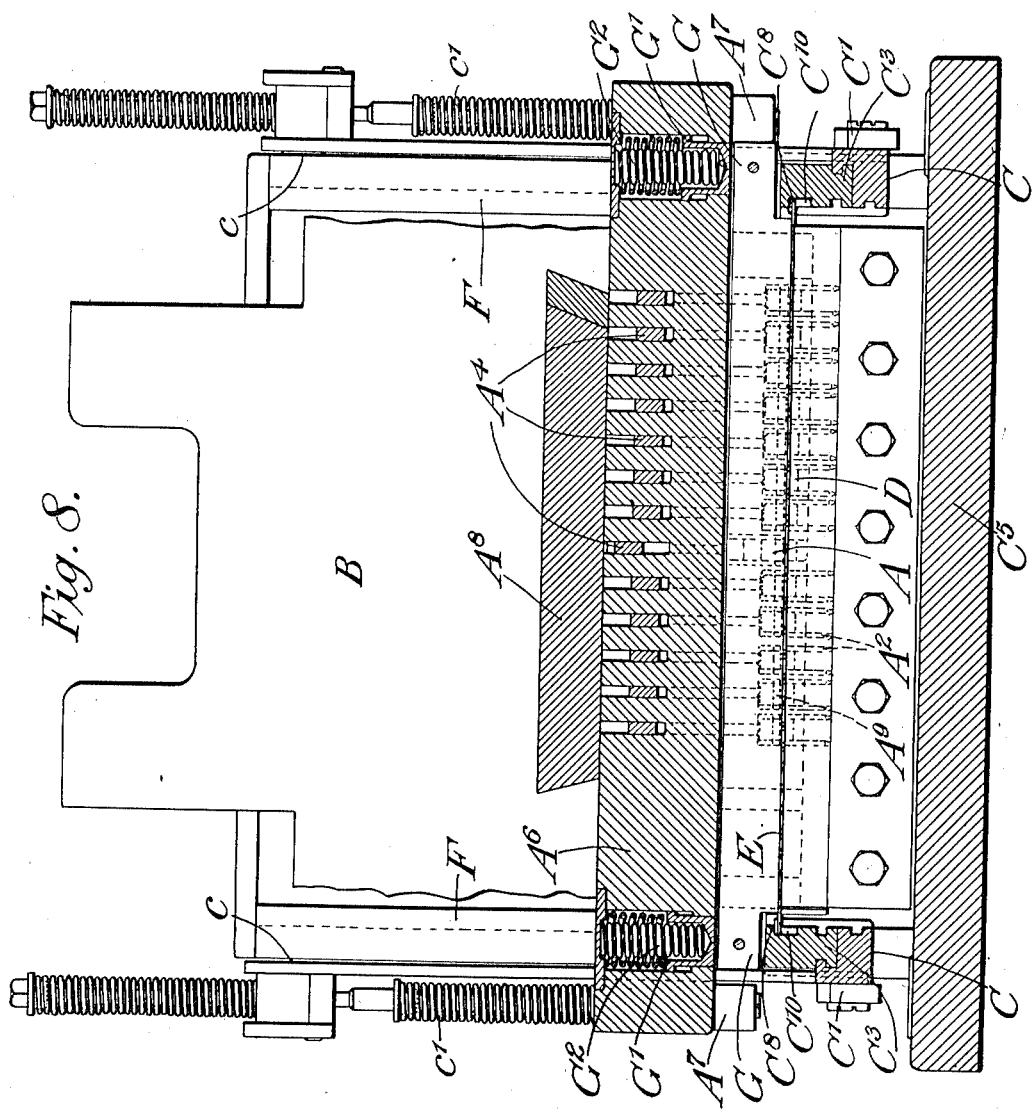

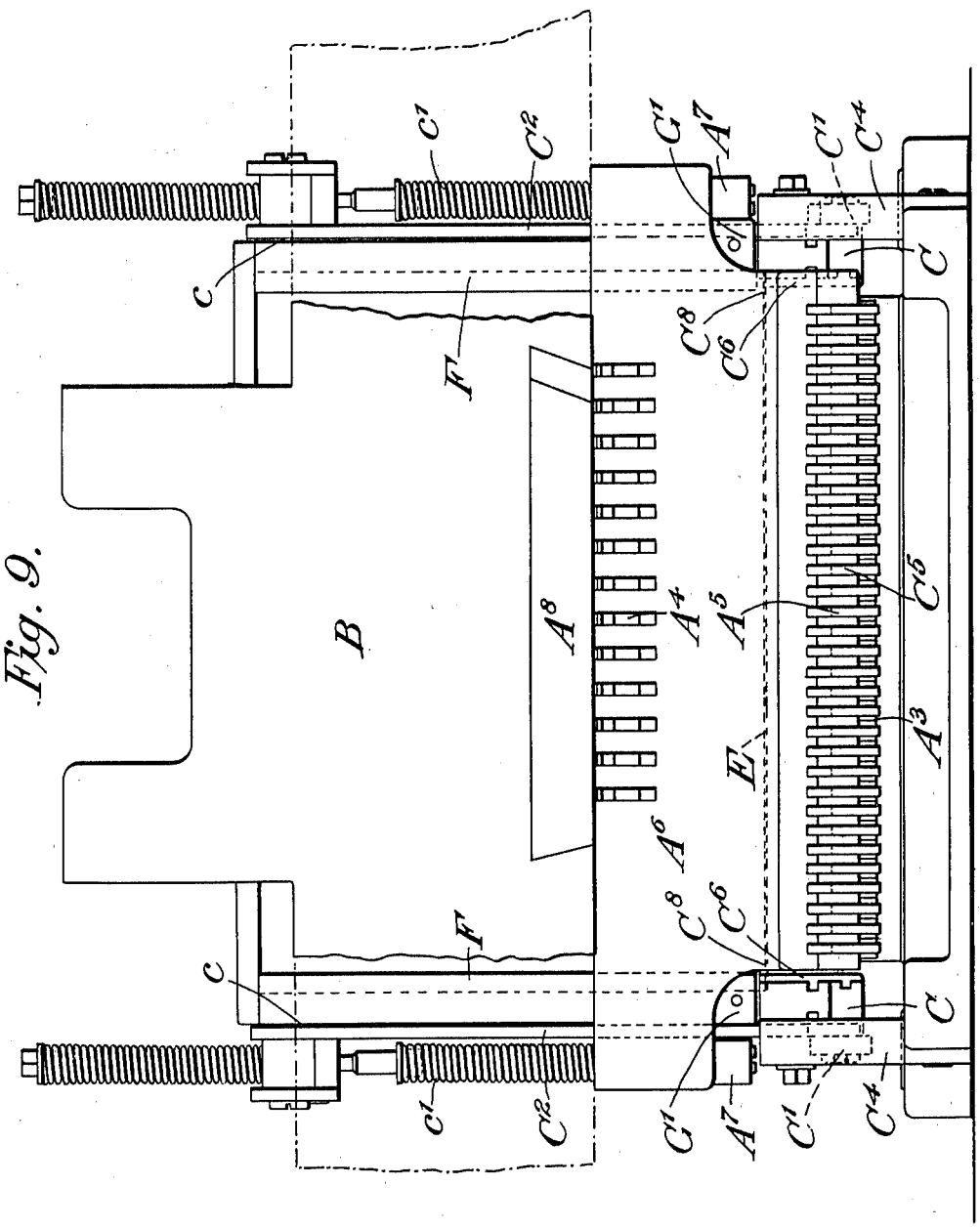

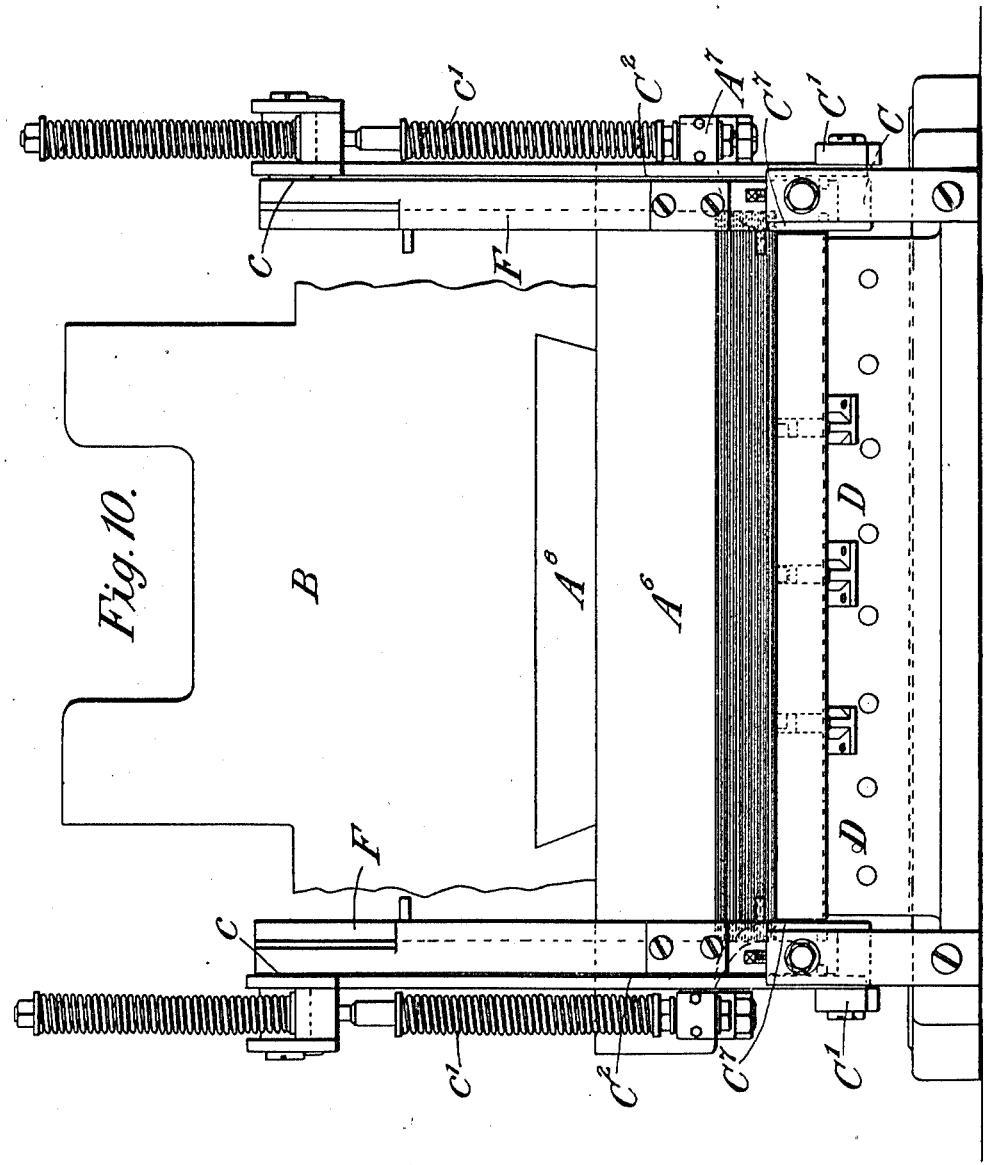

UNITED STATES PATENT OFFICE.

FRANK HINMAN PIERPONT, OF HORLEY, COUNTY OF SURREY, ENGLAND, ASSIGNOR TO LANSTON MONOTYPE MACHINE COMPANY, OF PHILADELPHIA, PENNSYLVANIA, A CORPORATION OF VIRGINIA.

STAMPING, PUNCHING, SHEARING, OR SIMILAR MACHINE.

1,061,563. Specification of Letters Patent. Patented May 13, 1913.

Application filed March 4, 1912. Serial No. 681,426.

*To all whom it may concern:*

Be it known that I, FRANK HINMAN PIERPONT, a citizen of the United States, residing at Salford, Horley, in the county of Surrey, England, have invented a certain new and useful Improvement in Stamping, Punching, Shearing, or Similar Machines; and I do hereby declare the following to be a full, clear, and exact description of the same, reference being had to the accompanying drawings, forming a part of this specification, and to the figures and letters of reference marked thereon.

This invention relates to stamping, punching, shearing or like machines and has for its chief object to provide, in a machine furnished with one or more series of tools carried or operated by a common reciprocating or moving head, controlling mechanism or devices for each tool so that any one or any number of these tools can be moved out of operative position or rendered inoperative at will, or any tool or any particular combination of tools may be rendered operative.

In accordance with this invention, each tool has connected to or is furnished with mechanism carried also in the movable head and under control of the attendant so that any one or more of the tools while still partaking in the movement of the head can be withdrawn by the action of the controlling devices so as to be inoperative on the workpiece. Operatively connected with the movable head is a feeding device which, during the descent of the head, feeds a workpiece forward, preferably from a magazine, into position to be acted upon by the tools and finally ejects the workpiece, on the ascent of the head, after the tools have acted.

The tools, according to the present invention, while secured in the head against yielding under the pressure of the stamping, punching or shearing operation, are mounted so that they can be withdrawn from operative position relatively to the head by a hand or like operated handle or lever connected with each tool by a cam or similarly acting device. During the action of the tools the workpiece is forced down on to an anvil or supporting block by a spring-controlled or resilient clamping bar or member carried by the head. After the tools are raised, the workpiece is automatically raised or moved to a position to be withdrawn by the feeding device. The ejection of the finished workpiece is controlled by a switch or latch projecting into the feed channel in such a manner as to permit the workpiece to be fed forward by the feeding device but on the return movement to engage the work-piece remove it from the control of the feeding device and direct it to a discharge opening or chute. The workpieces or "blanks" are disposed in a magazine arranged vertically on the machine with the lower edge terminating slightly above the level of a feeding slide which is connected through a yielding coupling with an arm operated by the tool-carrying head.

The invention is hereinafter described and illustrated as embodied in a machine provided with two sets or series of tools each arranged to act upon or along opposite sides of the workpiece, which is in the form of a bar having projections or pieces along its two edges, some of which are to be removed by the tools. By withdrawing one or more of the tools from operation as above referred to any desired combination of projections may be left on the bar.

Figure 2:
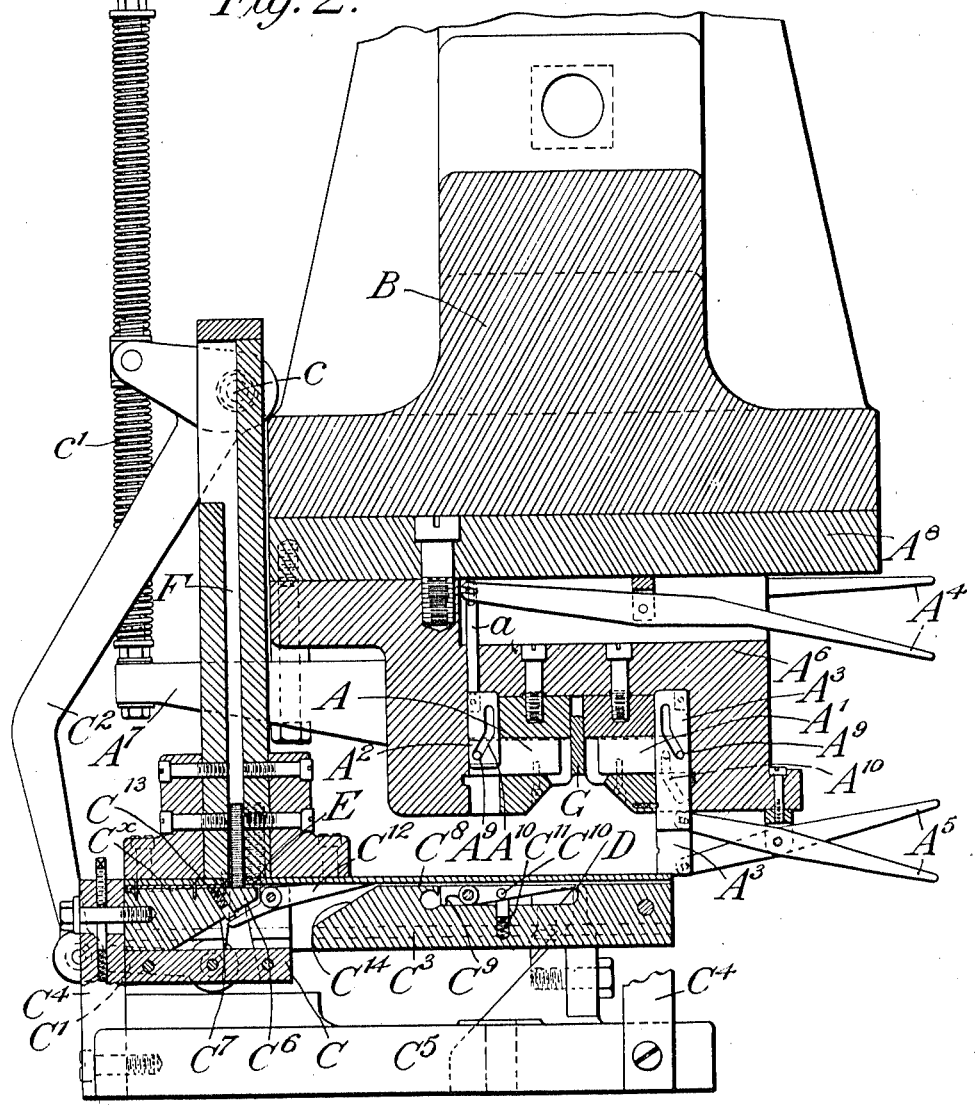

Referring to the accompanying drawings:—Figure 1 is a front elevation of a machine embodying the present invention. Fig. 2 is a sectional elevation on the line 2—2 of Fig. 1. Fig. 3 is a view similar to Fig. 2 but showing the parts at a different point in the cycle of operations. Fig. 4 is another view similar to Fig. 2 showing the parts at still another point in the cycle of operations. Fig. 5 is a sectional elevation on the line 5—5 of Fig. 1. Fig. 6 is a sectional plan on the line 6—6 of Fig. 1. Fig. 7 is a sectional plan on the line 7—7 of Fig. 1. Fig. 8 is a sectional elevation on the line 8—8 of Fig. 6. Fig. 9 is a front elevation showing the mechanism for moving the various tools into and out of operative position. Fig. 10 is a rear elevation showing the feeding devices.

The same letters of reference indicate the same parts throughout the drawings.

A A' are the tools; B is the movable crosshead in which the tools are carried; C are the feeding blocks or slides; D is the bar or anvil on which the workpiece rests when the tools act upon it; E is the workpiece; and F is the magazine or holder from which the workpieces are removed singly and fed to the tool operating position.

The bars E upon which the tools A A' are to operate are placed in the magazine F with all the possible projections $e$ $e'$ that may be required (see Fig. 6) to produce any desired combination, and a similar number of tools are provided so that any projection may be removed, and the tools are withdrawn by their respective levers from operative position so that any desired combination of projections may be left upon either side of the bar E. The tools A A' of the two opposed series are similar in construction and are in the form of blocks mounted to slide to and from the plane of operation in guides in a block $A^6$ carried by the crosshead B.

The withdrawal of a tool is controlled by the operator for which purpose each tool is connected with a handle or lever $A^4$ or $A^5$. In the example shown each tool is provided with a pin or stud $A^9$ projecting into a cam slot $A^{10}$ in a block $A^2$ or $A^3$. These blocks are mounted to slide vertically in grooves in the block $A^6$ and to each block $A^2$ is connected one end of an operating lever. The levers $A^5$ controlling the tools A' have one end slotted to receive a pin on the block $A^3$ while the levers $A^4$ of the tools A are each connected to one end of a link $a$ secured to the block $A^2$ of a particular tool A. When a tool is to be withdrawn from operative position, the lever attached thereto is drawn down (see Fig. 2); this raises the particular cam slotted block so that the pin $A^9$ projecting therein, riding in the cam slot, withdraws the tool (see Figs. 2 and 6) from operative position.

The movements of cross head B are utilized to automatically effect the feeding of successive bars E from a magazine to the operating devices in the manner and by means about to be described.

Supported upon brackets $C^4$ on a detachable frame $C^5$ are two bars $C^3$ disposed in parallel relation and each provided on its inner face with a horizontal groove or channel $C^8$ the lower wall whereof is cut away, as at $C^{14}$, for the accommodation of a latch $C^{12}$ retained in position by a spring $C^{13}$ so as to yield under pressure of a bar E when the latter is advanced from the magazine to the tools, but so as to obstruct the feed channel $C^8$ and prevent the bar E from being returned beneath the magazine, which latter is composed of two bars F grooved on their inner sides and each mounted upon the corresponding bar $C^3$ in rear of opening $C^{14}$. The upper wall of the channel $C^8$ in each bar $C^3$ is provided with an opening in register with the groove in the associated magazine bar F, the arrangement being such that a pile of bars E supported and guided by the engagement of their opposite ends in bars F will rest upon and be supported by the lower members of channel $C^8$, with the bottom bar in the plane of said channel.

The lower member of channel $C^8$ in each bar $C^3$ is further provided with a recess immediately in rear of bar or anvil D for the accommodation of a pivoted finger $C^{10}$ which is constantly pressed upward at its outer end, the latter slightly overlapping the end of bar D, by a spring $C^{11}$ and prevented from rising too far by a stop $C^9$.

Guided to reciprocate longitudinally upon each bar $C^3$ is a head or slide C provided with two vertical extensions or plates $C^6$ $C^7$ separated to provide a vertical opening between them. The plates $C^6$ $C^7$ extend up across the channel $C^8$, the plate $C^6$ being slightly higher than $C^7$ and the latter being beveled on top at its rear portion, as at $C^x$. The cross head B is furnished at each end with an arm $A^7$ each connected by a spring or resilient coupling $c'$ to one arm of a lever $C^2$ the latter fulcrumed at $c$ and connected by its other arm through a link $C'$ with the corresponding slide C.

When the head B descends the bar E is clamped between the block D and a bar G carried in the block $A^6$. The bar G is yieldingly supported on springs $G^2$ mounted in sockets in the block $A^6$ with one end resting upon the inner ends of the sockets and the other end bearing on blocks $G'$ in the bar G. The fingers $C^{10}$ as the head B and bar G descend, yield under the pressure of the bar G (see Fig. 3) and as the head ascends after the tools A A' have acted, these fingers raise the finished bar E to the level of the feed channel $C^8$ to allow it to be withdrawn and ejected by and on the return movement of the slides C. As the slides C return, the front plates $C^6$ engage the bar, and the forward ends of the latches, when the slide has moved back, engage the finished bar E and remove it from the slides C so that it drops out of the machine through the opening $C^{14}$.

What I claim is:

1. In a stamping, punching, shearing or similar machine the combination with a series of tools the members of which are simultaneously movable with and also separately relatively to a reciprocating head, of a cam piece coupled with each tool and a hand operated lever pivoted in the head and connected one to each cam piece substantially as described.

2. In a stamping, punching, shearing or similar machine the combination with a reciprocating head and one or more series of tools the members of which are simultaneously movable with and separately relatively to the head of a movable feed-slide connected with the head through a resilient coupling and adapted to deliver a blank to the tools and remove it therefrom when finished and a switch or latch in the feed channel for effecting the ejection of the finished blank from the machine, substantially as described.

3. In a punching, stamping, shearing or similar machine the combination with one or more series of tools the members of which are simultaneously movable with and separately relatively to a reciprocating head, of a stationary support for the blank during the operation of the tools and a resiliently supported blank clamping bar carried by the head, substantially as described.

4. In a punching, stamping, shearing or similar machine furnished with one or more series of tools carried by a reciprocating head, the combination with a feeding device controlled by the head, of supports for the blank adapted to yield under pressure of the head and deposit a blank on a stationary support and so automatically raise the finished blank again into the path of the feeding device, substantially as described.

FRANK HINMAN PIERPONT.

Witnesses:
H. D. JAMESON,
O. J. WORTH.